United States Patent Office

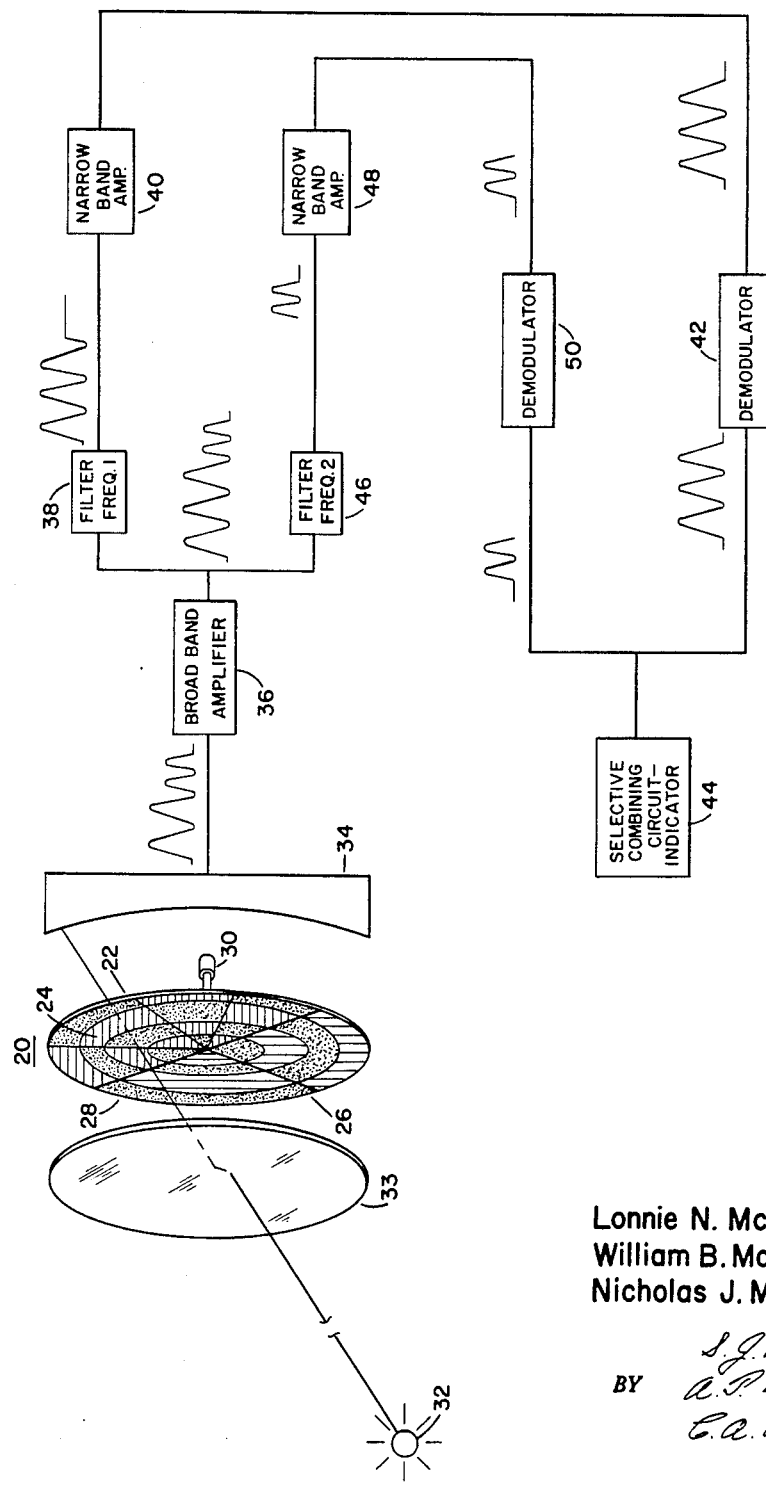

3,023,661
Patented Mar. 6, 1962

3,023,661
ROTARY RADIATION DISCRIMINATOR
Lonnie N. McClusky, Toney, William B. McKnight, Guntersville, and Nicholas J. Mangus, Jr., Huntsville, Ala., assignors to the United States of America as represented by the Secretary of the Army
Filed June 9, 1960, Ser. No. 35,095
3 Claims. (Cl. 88—1)
(Granted under Title 35, U.S. Code (1952), sec. 266)

The invention described herein may be manufactured and used by or for the Government for governmental purposes without the payment of royalty thereon.

This invention relates to radiation discriminators, and more particularly to a rotary element radiation discriminator.

Oftentimes objects will radiate energy in particuar bands or frequencies, and not in others; and, at times, it is desirable to detect, locate or track such objects. An example of such an object is a jet aircraft during flight when it radiates extensively in the infra-red region, but to an almost negligible extent in the upper visible region. In such cases, it is customary to utilize a radiation discriminator to modulate point sources of energy. In the usual discriminator, a reticle of alternate opaque and transparent sections, known as a chopper, is revolved between a detecting device and the object to be detected. When such a device is pointed at an object radiating in one of the bands in which subsequent detectors operate, the device will produce a change in level of output as the alternately open and shut sections of the reticle sweep between the object and the detector. Thus the object is distinguished from the background.

This system has many disadvantages, the major of which concerns the signal output. The above described device must have a synchronizing signal taken from the revolving disc if the sections of the reticle are to be related to the signal, and the output will sometimes include spurious signals. A further disadvantage of the above device, is that it fails to distinguish between broad areas of radiation and smaller point sources, the usual targets of interest falling in the latter category, the former including such things as clouds. Therefore it is the purpose of this invention to reveal an improved radiometer which will provide a means of distinguishing small point sources while excluding larger sources, and other spurious signals, without the necessity of obtaining synchronization from the rotating element; which provides other than an unidentified signal; and which will discriminate between "false target" sources and point sources.

The concerned invention consists of two or more filters with a superimposed pattern of alternate, opaque and transparent, areas arranged in a reticulated configuration of repeated involute pattern. A straight line, such as a horizon, or a long thin object such as a cloud, is broken into many segments, one of which is uncovered as the other is covered, thus maintaining an approximately constant overall presentation and is thus undetected. A point source, however, will be either completely covered or completely uncovered, thus giving a definite signal. Each of the filters is constructed with a different size and number of opaque and transparent areas, and therefore, as the filter element is rotated, it will produce a chopping action which results in a different detected output frequency for each filter.

For example, if the above described device was pointed at an object which was radiating infrared on a blue background, and the device was equipped with low frequency pass (infrared) and high frequency (upper visible spectrum) pass filters, the following would occur: As the infrared filter passed infrared from the target, but no signal from the blue background, the reticulations would chop the signal, providing a pulsing output of a first frequency, the high filter would pass the blue light which would not change, giving a steady signal. As the high filter came over the target, the infrared filter would leave the target. The infrared filter would then give out no signal, while the high filter would give out a reduced "negative" signal (since the target represents a dark spot or "hole" in the blue background) at a second frequency. By an examination of the frequencies given out by the two reticle patterns employed on the device the frequency band corresponding to a certain filter can be identified.

This invention may be better understood by reference to the following description and drawings, where:

FIGURE 2 is an overall diagram showing a radiometer system constructed in accordance with the invention.

Figure 1:
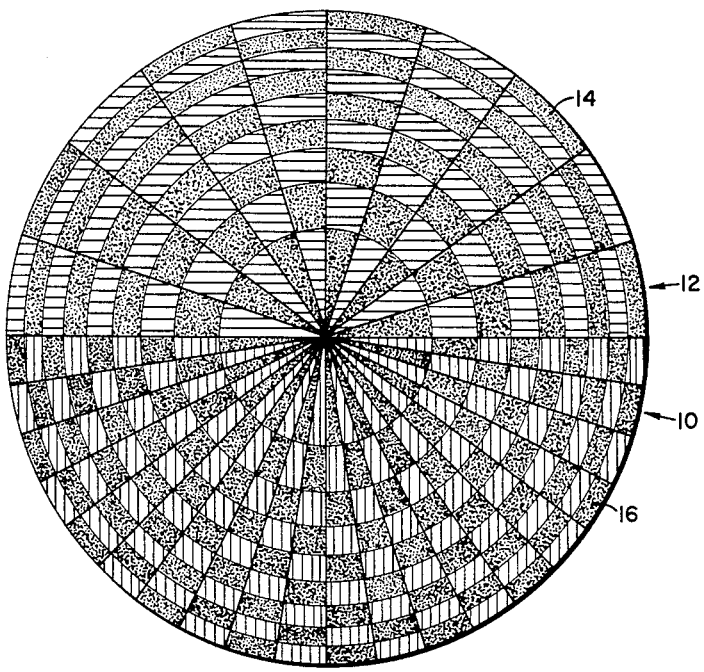
FIGURE 1 illustrates a filter and reticle element in accordance with the invention.

Referring to FIGURE 1, there is shown a reticle consisting of two semicircular filters, 10 and 12 with opaque overlaid reticular involute patterns 14 and 16, opaque pattern 14 covering filter 12 and opaque pattern 16 covering filter 10. It will be observed that pattern 14 has ten radial segments and pattern 16 has twenty radial segments. Each segment consists of five opaque regions (counted radially) separated by filter regions. Adjacent segments differ in that the sequence of filter-opaque regions are reversed in accordance with the reticular, involute pattern.

FIGURE 2 shows a complete radiometer system employing a two-color, two-frequency filter-reticle circular assembly 20 of the general type shown in FIGURE 1. The assembly employs a first filter-chopper section 22, covering one semicircle in which the filter region 24 will pass radiation in a first band A (infra-red) and not in a second band B (blue), and a second filter-chopper section 26, covering the remaining semicircle in which the filter region 28 will pass band B but not band A. Filter-chopper section 22 has four radial chopping elements, and filter-chopper section 26 has two radial chopping elements, thus when the assembly is rotated, by motor 30, radiation chopped by section 22 will be chopped at double the rate, or frequency, of radiation chopped by section 26. Assume now that against a background of band B, radiation within band A is emitted by target 32, collected by lens 33 and, due to the orientation shown, passed in chopped form by reticle-filter section 22 to radiation detector 34. Assume further that the speed of motor 30, and the chopping frequency, is adjusted to a rate of 50 pulses per second. A corresponding electrical output of detector 34 is initially amplified in broadband amplifier 36, filtered in 50 cycle filters 38, then amplified further in narrow band amplifier 40, rectified in demodulator 42 and fed to selective combining circuit 44. Electrical waveforms illustrating the treatment of the signal from detector 34 to the combining circuit 44 are shown adjacent the opposite blocks. During the second half of the rotation of assembly 20, filter-reticle section 26 is interposed between target 32 and radiation detector 34. Filter region 28 of reticle section 26 will pass background radiation, B and B, but not the radiation in band A, from the target. Chopping occurs because the target appears as a "hole" in the radiation, and thus there is a difference in radiation striking the radiation detectors when the "hole" is covered by an opaque region of the filter-reticle section 26 from that striking it when the hole is uncovered. In the first instance all uncovered regions of the section pass radiation and in the second instance one of the uncovered regions (the one viewing the "hole") passes less than in the first instance. Chopping by reticle-filter section 26 produces an output from radiation detector 34 at a frequency of 25 pulses per second since this section has half the radial chopping elements of reticle-filter section 22. The output of detector 34 is amplified in broadband amplifier 36, filtered in 25 cycle filter 46, amplified in narrow band amplifier 48, rectified in demodulator 50 and fed to selective combining circuit 44. In combining circuit 44, means are provided to indicate an output corresponding to either, both or the difference between the signals in the chopper channels. By providing these alternatives, data as to the nature of the target can be determined, which has not been possible with previous chopping systems which give only single-band information.

As an example, a white body radiation source gives an output, a target radiating or not radiating in either color and neutral in relation to the background gives an output, as does the present case of a target not radiating in one color and radiating in another color.

A further advantage is inherent in this device, in that if direct current amplification and filtering is used throughout, and the output difference between applied signals is combined in circuit 44 the device will reject white body radiation, while accepting all others, since white body radiation will give identical signals to each channel, which will then cancel each other in circuit 44.

The principles of the invention explained in connection with a specific exemplification thereof will suggest many other applications and modifications of the same. It is accordingly desired that, in construing the breadth of the appended claims, they shall not be limited to the specific details shown and described in connection with exemplifications thereof. Therefore, what is claimed as novel and it is desired to be secured by Letters Patent of the United States is:

1. A radiation discriminator comprising a rotary element, said rotary element comprising circularly and radially disposed alternate opaque and transmissive areas, said areas being disposed in a generally reticular pattern in the form of a series of involute curves, said element being divided into a first and second semicircular sector, said first sector having at least twice the frequency of circular occurrence of said alternate areas as the second sector, said transmissive areas in each sector comprising a light bandpass filter, each of said filters being transmissive to different bands of light.

2. A radiation discriminator as set forth in claim 1 wherein the first sector filter comprises a bandpass filter in the infra-red region and said second sector filter comprises a bandpass filter of a shorter wavelength band.

3. The radiation discriminator as set forth in claim 2, further comprising means to rotate said rotary element, optical means for projecting radiation through said element, radiation detection means providing an electrical output, first and second electrical bandpass filter means, first and second demodulator means, and electrical combining means, said detection means being responsive to radiation projected through said element for providing an electrical output of a first frequency signal responsive to light chopping by said first sector and for providing an electrical output of a second frequency signal responsive to light chopping by said second sector, said first bandpass filter comprising means responsive to an output of said detection means for passing only said first frequency, said second bandpass filter comprising means responsive to an output of said detection means for passing only said second frequency, said first demodulator means comprising means responsive to the output of said first bandpass filter means for rectifying said first frequency signal, said second demodulator comprising means responsive to the output of said second bandpass filter for rectifying said second signal, said electrical combining means comprising means responsive to one or both of the outputs of said demodulator means for selectively indicating an output signal.

References Cited in the file of this patent
UNITED STATES PATENTS

| | | |
|---|---|---|
| 1,986,541 | Skinner | Jan. 1, 1935 |
| 2,162,529 | Dawson et al. | June 13, 1939 |
| 2,967,247 | Turck | Jan. 3, 1961 |